W. H. KUHNS.
COMBINED FERTILIZER DISTRIBUTER AND PULVERIZER.
APPLICATION FILED JUNE 3, 1911.
1,013,298.
Patented Jan. 2, 1912.
4 SHEETS—SHEET 1.
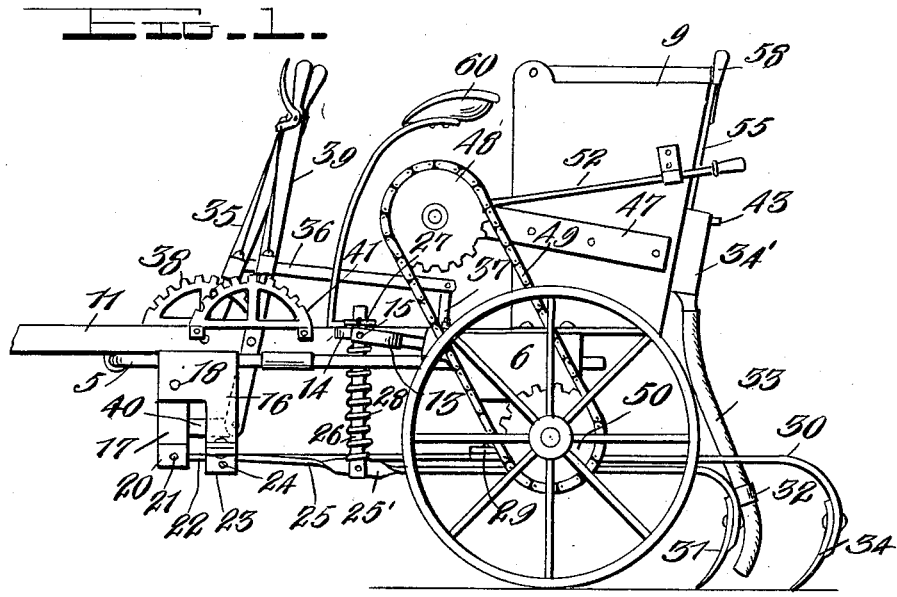
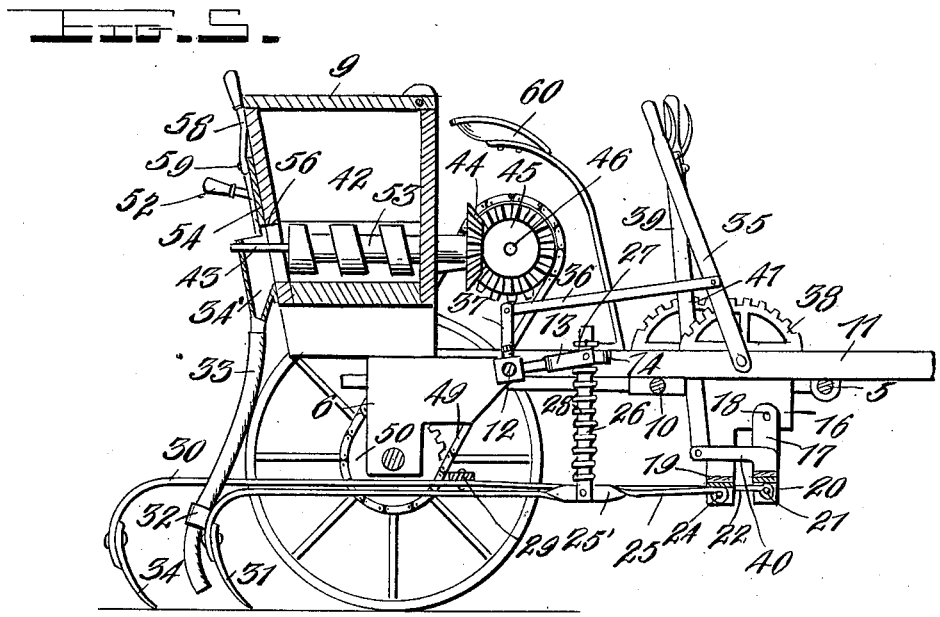
Witnesses
Chas. L. Griesbauer.
L. G. Ellis.
Inventor
W. H. Kuhns,
By Watson E. Coleman,
Attorney

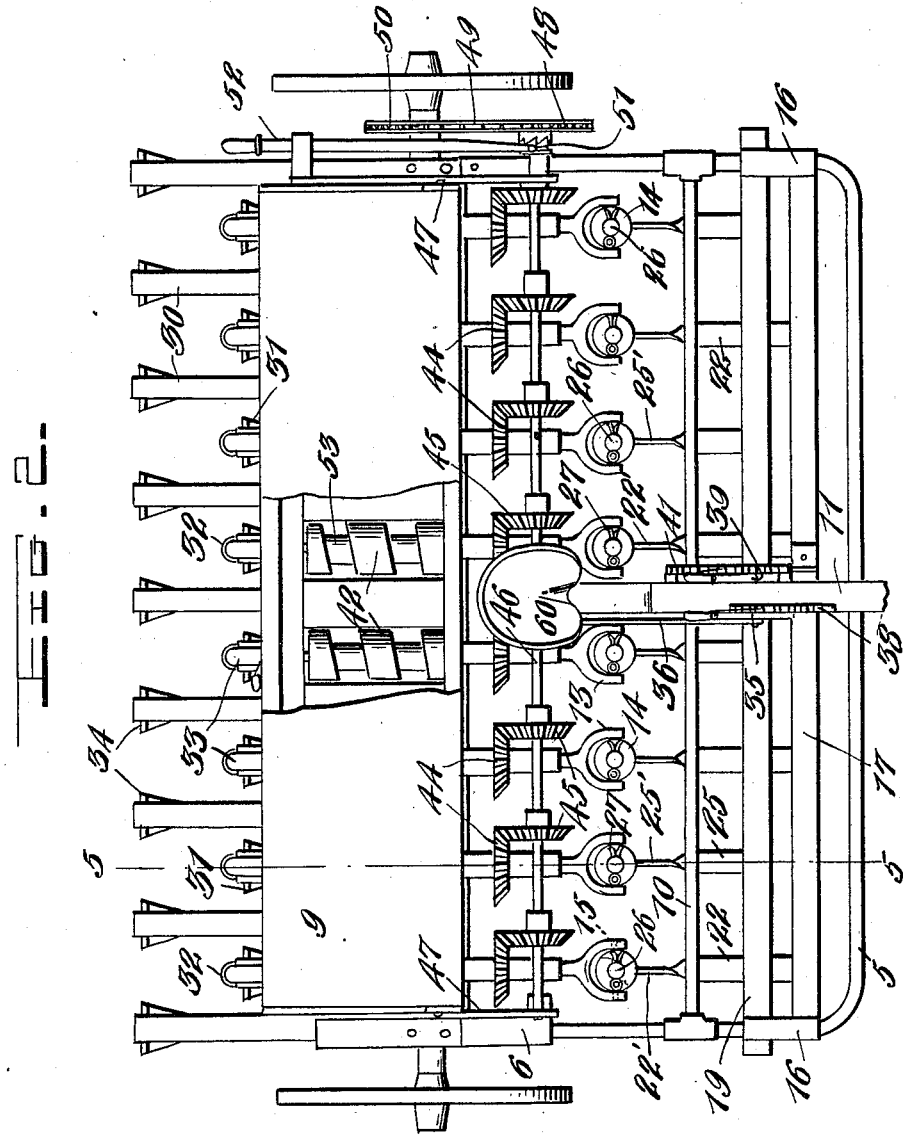

W. H. KUHNS.
COMBINED FERTILIZER DISTRIBUTER AND PULVERIZER.
APPLICATION FILED JUNE 3, 1911.
1,013,298.
Patented Jan. 2, 1912.
4 SHEETS—SHEET 3.
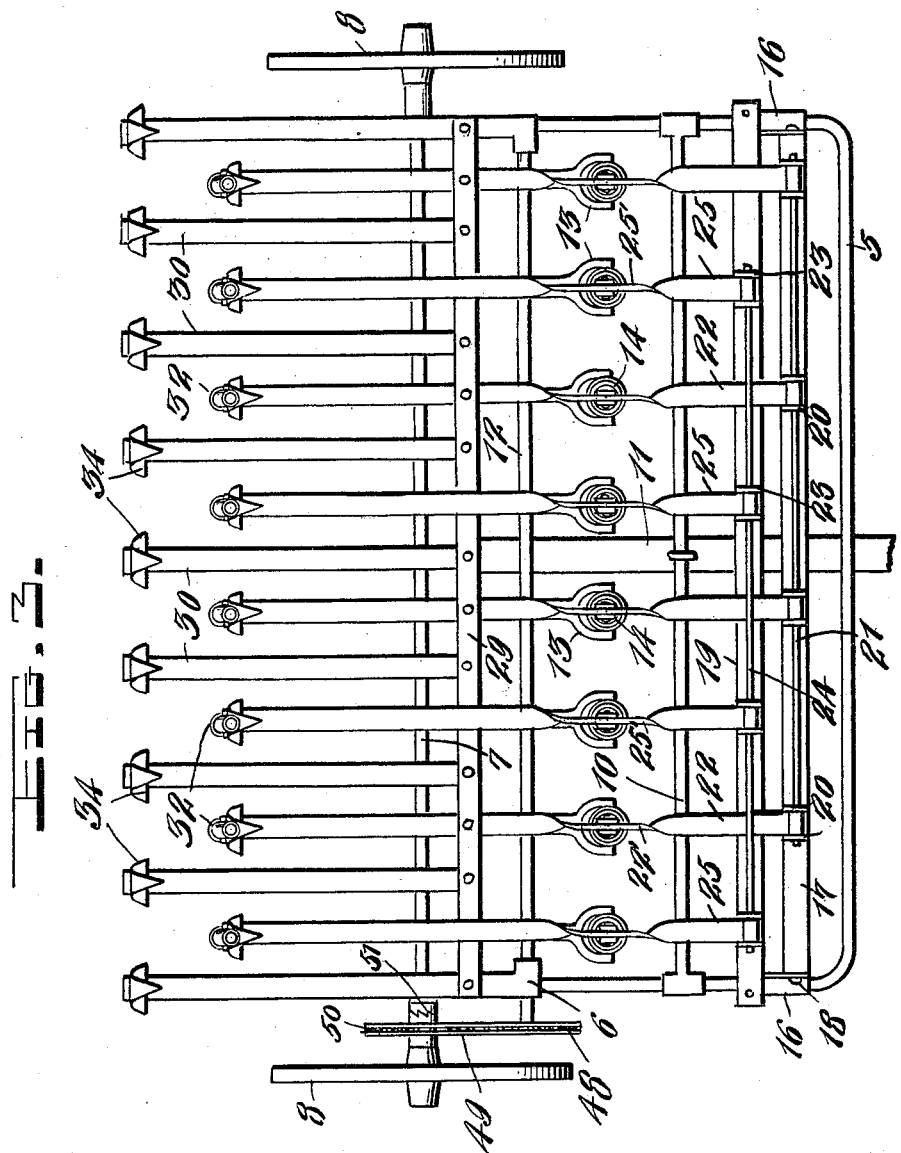
Witnesses
Chas. L. Grieshaver.
L. G. Ellis.
Inventor
W. H. Kuhns,
By Watson E. Coleman.
Attorney

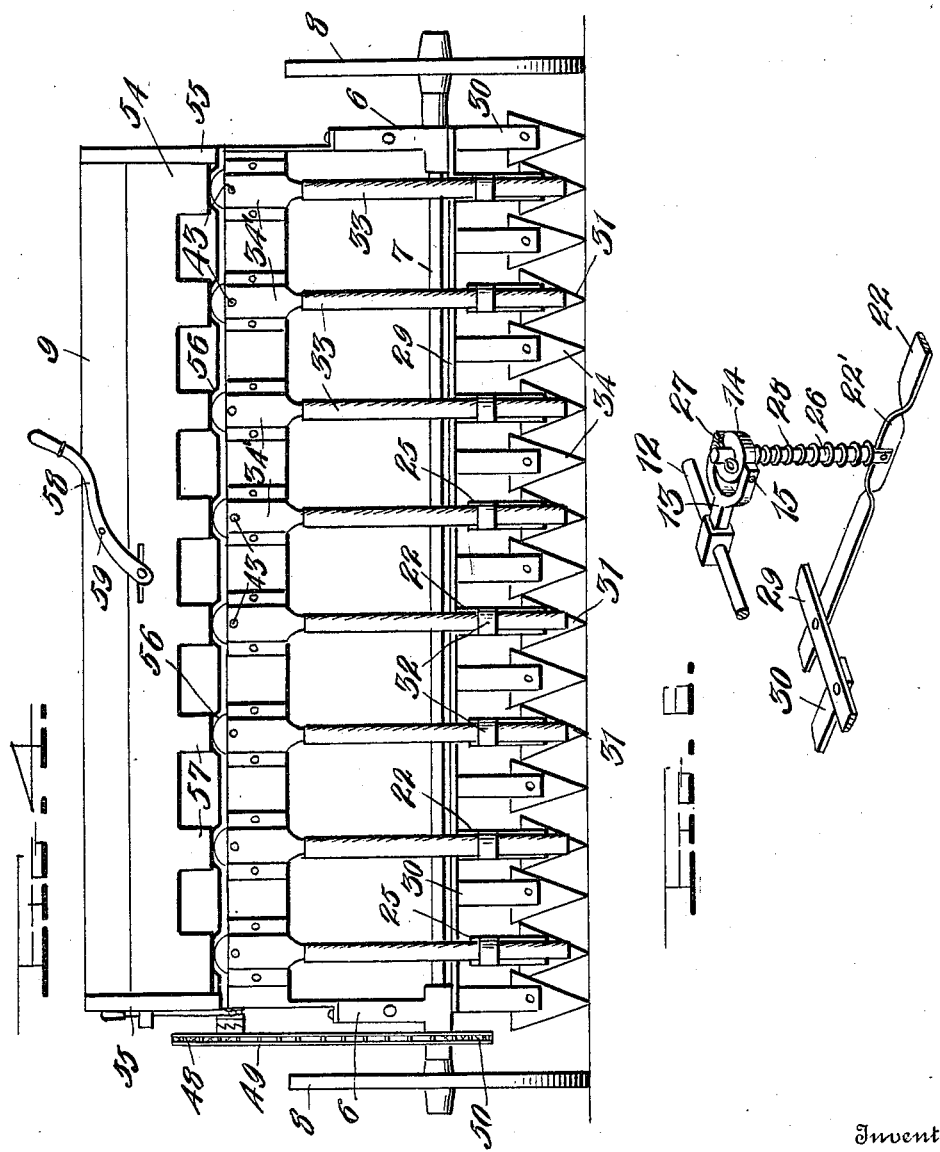

UNITED STATES PATENT OFFICE.

WILLIAM HENRY KUHNS, OF MIAMISBURG, OHIO.

COMBINED FERTILIZER-DISTRIBUTER AND PULVERIZER.

1,013,298.  Specification of Letters Patent.  Patented Jan. 2, 1912.

Application filed Jnue 3, 1911. Serial No. 631,106.

*To all whom it may concern:*

Be it known that I, WILLIAM HENRY KUHNS, a citizen of the United States, residing at Miamisburg, in the county of Montgomery and State of Ohio, have invented certain new and useful Improvements in Combined Fertilizer-Distributers and Pulverizers, of which the following is a specification, reference being had to the accompanying drawings.

This invention relates to a combined fertilizer distributer and pulverizer and has for its primary object to provide a comparatively simple and efficient machine of this character whereby furrows are first formed to receive the fertilizer, and the earth which is thrown out of the furrows then pulverized and spread over the fertilizer.

Another object of the invention resides in the provision of a plurality of furrow openers and a plurality of spring pulverizing teeth arranged relatively thereto, means for adjusting the pulverizing teeth and certain of the furrow openers with relation to the remaining furrow openers, and additional means for yieldingly holding the furrow opening blades and the spring teeth in engagement with the ground.

A further object of the invention is to provide a fertilizer hopper, a plurality of depositing tubes connected to the hopper, means arranged within the bottom of the hopper and automatically actuated to discharge the material into the tubes, and additional means for regulating the discharge of said material.

With the above and other objects in view, the invention consists of the novel features of construction, combination and arrangement of parts hereinafter fully described and claimed, and illustrated in the accompanying drawings, in which—

Figure 1 is a side elevation of a machine embodying my improvements; Fig. 2 is a top plan view; Fig. 3 is a bottom plan view; Fig. 4 is a rear end view; Fig. 5 is a longitudinal section taken on the line 5—5 of Fig. 2; and Fig. 6 is a detail fragmentary perspective view of certain parts of the mechanism.

Referring in detail to the drawings 5 designates a substantially U-shaped frame and to the rear ends of said frame suitable bearings 6 are secured in which the wheel axle 7 is mounted, said axle being provided on either end thereof with the supporting wheels 8. Upon the bearings 6 a box or hopper 9 is rigidly mounted, and this hopper is adapted to contain the fertilizing material which is fed therefrom and deposited in the ground, in the manner which will be more fully hereinafter set forth. The parallel end portions of the frame 5 are connected and braced by means of the transverse bar 10, and to said bar and the frame the forwardly extending tongue 11 is secured. Upon this tongue the usual draft attachments are arranged. A rock shaft 12 is mounted in the bearings 6 and to this shaft a plurality of forwardly extending yokes 13 are rigidly fixed. In each of these yokes a collar 14 is pivotally mounted, the arms of the yokes being provided with apertures to receive trunnions 15 formed on the collars. To the parallel arms of the frame 5 at their forward ends the hanger plates 16 are secured. A transverse bar 17 has its extremities vertically disposed and pivotally mounted upon said plates as indicated at 18. A second transverse bar 19 is arranged in parallel relation to the bar 17 and is rigidly fixed at its ends to the hanger plates. Suitable bearings 20 are secured to the under side of the bar 17 and have mounted therein a rod 21. Rearwardly extending bars 22 extend beneath the bar 19 at their forward ends which are pivotally engaged upon the rod 21 between the parallel portions of the U-shaped bearing plates 20. The transverse bar 19 is also provided with U-shaped bearing plates 23 in which the rod 24 is mounted. To this rod the forward ends of a second series of rearwardly extending bars 25 are pivotally connected. The bars 22 and 25 are twisted intermediate of their ends as indicated at 22' and 25' respectively, to which portions of said bars the lower ends of the vertically disposed rods 26 are pivotally connected. The upper ends of the rods 26 extend through the collars 14, suitable cotter pins 27 being disposed through said rods to retain the collars thereon. Coiled springs 28 are arranged upon the rods 26 between the collars and the bars 22 and 25, said springs normally maintaining the yokes 13 in an elevated inclined position as shown in Fig. 1. A transverse bar 29 is rigidly secured to the bars 22 adjacent to their rear ends and to this transverse bar a third series of rearwardly extending bars 30 are rigidly fixed at their forward ends, said latter series of bars being located between the two first named series. The bars 22 and 25 each have secured to its downwardly turned rear end a shovel or furrow opener 31 to which a collar 32 is attached to receive the lower end of a depositing tube 33, the upper end of which is attached to one of a series of depending spouts 34' which are fixed to the rear of the box or fertilizer hopper 9. The last named series of bars 30 also have secured to their rear ends the pulverizing blades or teeth 34 which are adapted to break up or pulverize the earth thrown from the furrows by the shovels 31, and dispose the same over the fertilizing material.

The depth to which the shovels 31 and the blades 34' engage in the ground is regulated by means of a lever 35 which is mounted upon one side of the tongue 11 and is connected by means of the link bar 36 to an arm 37 rigidly fixed upon the rock shaft 12. The lever 35 carries the usual spring pressed pawl for engagement with the teeth of a rack 38 which is mounted upon the tongue 11. It will therefore be seen that by simply manipulating the lever 35, the shaft 12 may be rocked in the bearings 6 to force the collars 14 downwardly upon the springs 28, said springs acting upon the bars 22 and 25 to depress the same together with the third series of bars 30, and yieldingly hold the same in their adjusted positions. Upon the opposite side of the tongue 11 a second lever 39 is pivotally mounted, the lower end of said lever being pivotally connected to the end of an arm 40, the other end of which is fixed to the bar 17. This lever also carries a suitable locking dog for engagement with the teeth of the rack 41. As previously stated, the bar 17 is pivotally connected at its ends to the hanger plates 16, and it will therefore be obvious that when the lever 39 is manipulated, the two series of bars 22 and 30 which are rigidly connected by means of the transverse bar 29, will be moved longitudinally and the furrow opening and pulverizing blades which are carried thereby will be positioned with relation to the furrow openers carried by the other series of bars 25.

In the bottom of the seed box or hopper 9, a series of discharge cylinders or drums 42 are rotatably mounted. These cylinders are disposed longitudinally of the machine and are provided in each of their ends with a stud shaft 43 which are mounted in the receiving spouts 34 and in the front side wall of the box 9. Upon the forwardly extending cylinder shafts, the beveled gears 44 are fixed. These gears mesh with a series of beveled gears 45 mounted on a shaft 46 arranged in the bearings 47 which are secured to opposite ends of the box or hopper 9. Upon one end of this shaft 46, a sprocket 48 is loosely mounted and is connected by means of a drive chain 49 with a sprocket 50 fixed upon the wheel axle. A clutch member 51 is keyed or otherwise slidably mounted on the shaft 46 and is actuated by means of a lever 52 to engage the same with a clutch face formed upon the sprocket 48 whereby said sprocket may be locked upon the shaft 46 to transmit rotary movement to the cylinder 42. Each of the cylinders is provided with a spiral groove 53 in which the fertilizing material is carried in the rotation of said cylinders and deposited in the spouts 34. Upon the rear wall of the box or hopper 9 a vertically movable plate 54 is mounted in the guide-ways 55 arranged upon the rear of the box. The rear wall of the box 9 immediately above the cylinders 42 is cut away as indicated at 56, and a certain amount of material is directed in the rotation of the cylinders through these cut-away portions and into the spouts 34. The plate 54 is provided with the tongues 57 which are movable over the openings 56 to regulate the amount of material which passes therethrough. This regulating plate 54 is readily adjusted by means of a lever 58 which is pivotally arranged upon the rear side of the box or hopper 9 as indicated at 59, and is also pivotally connected to said movable plate. A suitable driver's seat 60 is mounted upon the tongue 11 adjacent the adjusting levers.

From the foregoing description taken in connection with the accompanying drawings, it is thought that the construction and operation of the machine will be readily understood.

In the movement of the machine over the field, the furrows are first formed, and the fertilizer material deposited therein, such deposit being continuous during the forward movement of the machine. The rear pulverizing blades which are disposed intermediate of the furrow openers, engage the soil which has been thrown from the furrows and break the same up into fine particles, and throw the same to either side back into the furrow upon the fertilizing material which has been deposited therein, thus covering the same so that the soil may more fully derive therefrom the enrichening properties which such material contains.

By means of the machine constructed as described, a large field may be quickly gone over, the fertilizer properly distributed and the soil pulverized at the same time. In this manner considerable time and labor which would otherwise be consumed is saved.

As the machine requires no attention other than the adjustment of the furrow openers and pulverizing blades, it will be readily seen that the machine requires no attention during operation, thus relieving the operator of considerable labor.

While I have shown and described the preferred form and construction of the various parts, it will be understood that the machine is susceptible of considerable modification without departing from the essential feature or sacrificing any of the advantages of the invention.

Having thus described the invention what is claimed is:—

1. The combination with a wheel supported frame, of a series of longitudinal bars pivotally supported from said frame at their forward ends, a second series of bars extending rearwardly of said first named series and rigidly connected thereto, furrow opening shovels carried by the bars of the first named series, pulverizing blades carried by the second named series of bars, and means for raising and lowering said series of bars to position the same with relation to the ground.

2. The combination with a frame, of a series of furrow opening members pivotally mounted in said frame, a series of pulverizing blades disposed rearwardly of said members and rigidly connected thereto, a second series of pulverizing members pivotally mounted in the frame, means for moving said first named series of furrow opening members and the pulverizing blades longitudinally to position the same with respect to the second named series of pulverizing members, and additional means for simultaneously moving all of said members and blades vertically to regulate the depth to which they engage in the ground.

3. The combination with a frame, of a series of furrow opening members pivotally mounted in said frame, a series of pulverizing blades disposed rearwardly of said members and rigidly connected thereto, a second series of pulverizing members pivotally mounted in the frame, means for moving said first named series of furrow opening members and the pulverizing blades longitudinally to position the same with respect to the second named series of members, a rock shaft mounted in the frame, and means yieldingly connecting the members of each of said series of furrow opening members to said rock shaft to yieldingly hold said members and the pulverizing blades in position with relation to the ground.

4. The combination with a frame, of a transverse bar pivotally mounted at its ends upon said frame, a series of longitudinally disposed furrow opening members pivotally mounted at their forward ends upon said bar, a second series of furrow opening members arranged intermediate of the members of said first named series, means mounted in the frame for raising and lowering said members to regulate the depth to which they engage in the ground, and additional means for moving said transverse bar to move said first named series of furrow opening members and position the same with relation to the second named series.

5. The combination with a wheel supported frame, of a transverse bar pivotally secured at its ends to said frame, a series of furrow opening members pivotally mounted upon said bar for vertical movement, a second transverse bar rigidly fixed to the frame, a second series of furrow opening members disposed intermediate of the members of the first named series and pivotally mounted on the second named bar, a series of pulverizing blades disposed rearwardly of the furrow opening members and intermediate of adjacent members of the two series, means for moving said pivotally mounted transverse bar to dispose the first named series of furrow opening members with relation to the second named series, and additional means mounted in the frame and connected to said series of furrow opening members to raise and lower the same, said means including coiled springs to yieldingly hold the furrow opening members in their adjusted positions.

6. The combination with a frame, of a series of earth disturbing members pivotally mounted in said frame, a second series of furrow opening members pivotally mounted in said frame and disposed intermediate of the members of said first named series, means for moving said first named series of members longitudinally with respect to the second named series, and additional means for simultaneously moving the members of both series vertically to regulate the depth to which they engage in the ground.

In testimony whereof I hereunto affix my signature in the presence of two witnesses.

WILLIAM HENRY KUHNS.

Witnesses:
 MAHLON GEBHART,
 D. W. YOUNG, Sr.